CORNER SUPPORT FOR CONTAINERS

Original Filed Oct. 8, 1965 2 Sheets-Sheet 1

INVENTOR

EDWIN B. CONNERAT

BY

Scrivener Parker Scrivener & Clarke

ATTORNEYS

CORNER SUPPORT FOR CONTAINERS

Original Filed Oct. 8, 1965 2 Sheets-Sheet 2

INVENTOR

EDWIN B. CONNERAT

Scrivener Parker Scrivener & Clarke

ATTORNEYS

United States Patent Office

Re. 26,640
Reissued Aug. 12, 1969

26,640

CORNER SUPPORT FOR CONTAINERS

Edwin B. Connerat, 6122 Woodmont Road,
Alexandria, Va. 22307

Original No. 3,321,162, dated May 23, 1967, Ser. No. 494,207, Oct. 8, 1965. Application for reissue Oct. 25, 1967, Ser. No. 689,733
Int. Cl. B60p *7/10*
U.S. Cl. 248—119 17 Claims

Matter enclosed in heavy brackets [ ] appears in the original patent but forms no part of this reissue specification; matter printed in italics indicates the additions made by reissue.

*ABSTRACT OF THE DISCLOSURE*

This invention relates generally to a corner support adapted to support at least one corner of a container in an elevated position relative to the horizontal platform of a cargo carrying vehicle, and more particularly to a corner support mounted in an opening in the platform and adapted for pivotal movement between a load carry-in position extending vertically upwardly from said platform, and a retracted position in which the uppermost surface of the support is coplanar with the platform.

It is well known in the patented prior art to rigidly secure support means on the platform of a cargo carrying vehicle to support the corners of a container during the transport thereof. When the support means are rigidly connected with the vehicle platform and are adapted to extend upwardly therefrom to support the container in elevated relationship relative to the platform, the problem presents itself that these support means constitute obstructions that interfere with and hinder the operation of the load transfer means by which the cargo is loaded upon and unloaded from the vehicle, particularly in the case where a plurality of containers are successively mounted upon the vehicle. Furthermore, the vertically extending rigid support means are not only subject to damage by the load transfer means, but also limit the versatility of the vehicle for use only with certain predetermined numbers and sizes of containers. The present invention was developed to avoid the above and other drawbacks of the known container transport supports.

The primary object of the present invention is to provide a container corner support that is pivotable between a vertical load supporting position and a horizontal retracted position in an opening contained in said platform, said support having, in said retracted position, an uppermost surface coplanar with said platform, whereby the upper surface of the platform is unobstructed and substantially continuous.

A more specific object of the invention is to provide support means of the type described above including releasable locking means for retaining the support in the vertical, load-supporting position. These locking means comprise at least one axially slidable lock bar that extends from a side wall of the support housing above the adjacent portion of the upper surface of the platform, said lock bar being retractable against the force of spring biasing means to permit pivotal movement of the support to the retracted position.

A further object of the invention is to provide a corner support of the type described above in which the support housing includes abutment means adapted to cooperate with the platform to prevent pivotal movement of the support beyond said extended and retracted positions. The abutment means for supporting said housing in the extended position includes first abutment means arranged on the housing side walls for engagement with the platform lower surface, and second abutment means on the housing transverse wall for engagement with the platform upper surface, whereby the container load is removed from the pivot axis when the housing is in the extended position.

A still further object of the invention is to provide on the platform of a cargo transporting vehicle a plurality of longitudinally spaced pairs of corner supports each mounted for pivotal movement between extended and retracted positions relative to the platform surface. At least some of the intermediate pairs of support housings are adapted to support the corner portions of successive pairs of longitudinally and/or laterally arranged containers, whereby the versatility of the vehicle for carrying different sizes and numbers of the containers is increased. Consequently, the vehicle platform may be readily adapted to support containers of varying lengths (on the order of five, ten, twenty or forty feet, for example) merely by the selective extension of the appropriate supports.

The support housings are either cast or are fabricated as a rigid assemblage, and normally weigh on the order of thirty pounds, whereby they may be easily displaced manually between their extended and retracted positions. Owing to the retractability of the support housings, the cargo transporting vehicle is adapted for both roll on and roll off piggy-back operations since the surface of the platform is unobstructed. The housings in their retracted positions are so supported that the uppermost surfaces thereof are generally coplanar with the platform surface and substantially fill the openings therein in which they are pivotally mounted, whereby the tires or treads of the load transfer apparatus are continuously supported during transport across the platform surface.

Other objects and advantages of the invention will become apparent from a study of the following specification when considered in conjunction with the accompanying drawing, in which.

Figure 3:
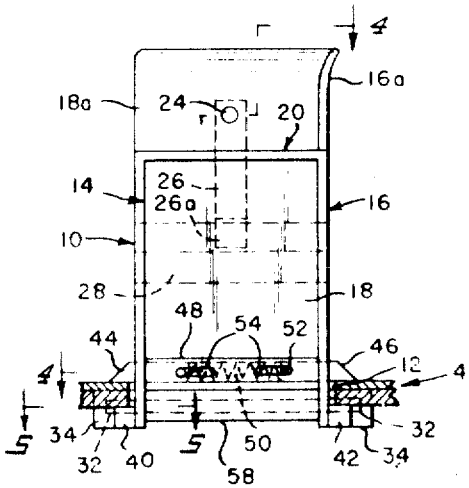
FIGURE 3 is a sectional view taken along line 3—3 of FIGURE 2.
Figure 4:
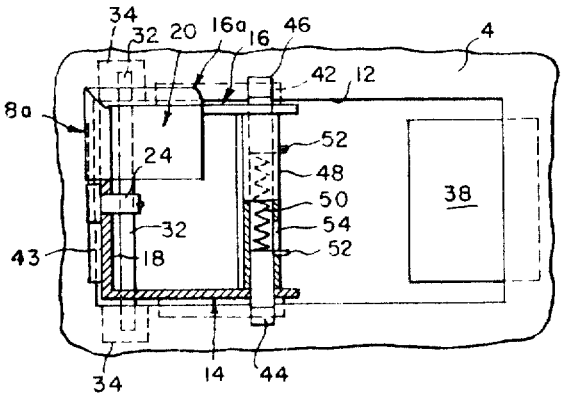
Figure 5:
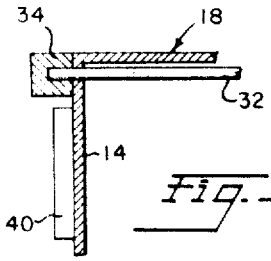
Figure 6:
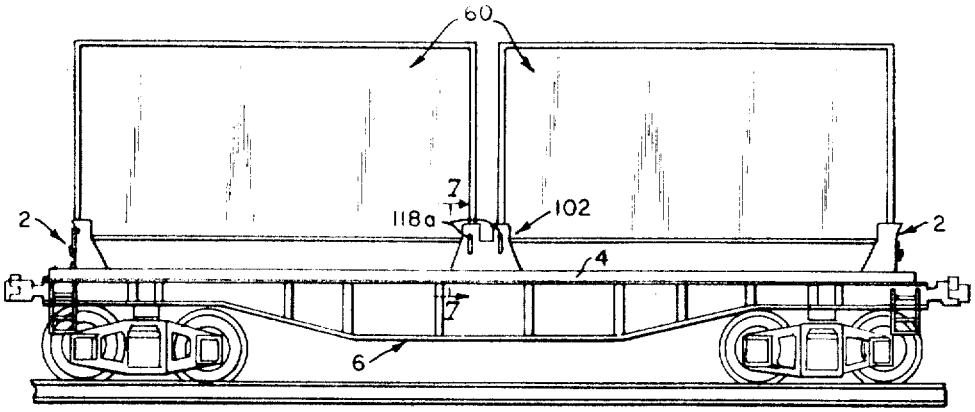
Figure 7:
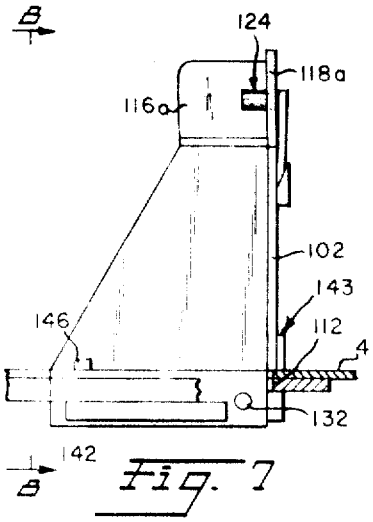
Figure 8:
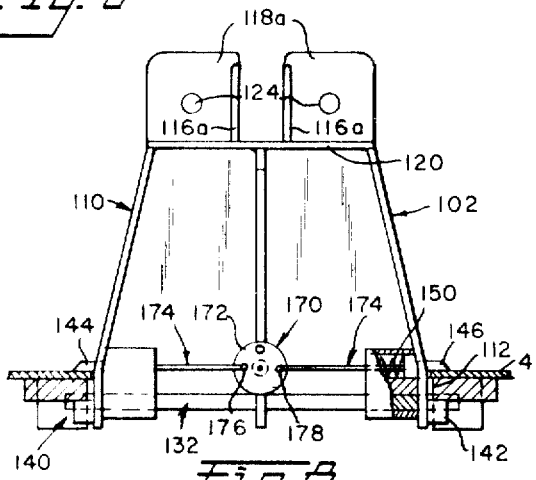

FIGURES 4 and 5 are sectional views taken along lines 4—4 and 5—5, respectively, of FIGURE 3;

FIGURE 6 illustrates a railroad flat car including both single-corner and dual-corner embodiments of the container supports of the subject invention;

FIGURE 7 is a detailed sectional view taken along line 7—7 of FIGURE 6;

FIGURE 8 is a sectional view taken along line 8—8 of FIGURE 7; and

Figure 9:
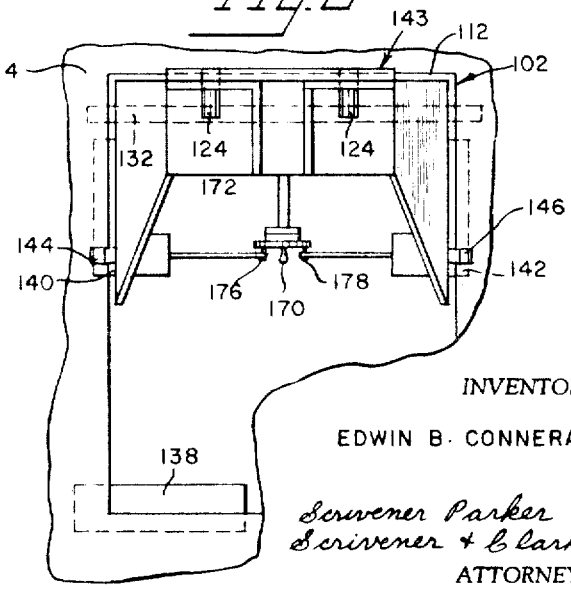

FIGURE 9 is a top plan view of the dual-corner support of FIGURE 8.

Referring first more particularly to FIGURES 1–5, four corner supports 2 are pivotally connected with the horizontal platform 4 or floor of a railroad flatcar 6 or other vehicle to support the four bottom corners of a cargo container 8 transported thereby. Each of the corner supports comprises a rigid cast or welded housing 10 mounted for pivotal movement in a corresponding opening 12 contained within the floor. The unitary housing includes first and second parallel spaced side walls 14 and 16, a third rear wall 18 normal to and connected between the rear edges of said first and second walls, and a fourth load-supporting wall member 20 that is horizontal and is connected between the upper edges of said first and second walls. The second and third walls 16 and 18 include at their upper ends orthogonally arranged vertical portions 16a and 18a, respectively, that extend above the fourth wall 20, to laterally support corresponding adjacent corner surfaces of the container 8. In accordance with one feature of the invention, at least one of the wall portions 16a, 18a includes means preventing vertical movement of the container 8 relative to the fourth wall 20. In the specific embodiment shown in FIGURE 2, these container stabilizing means comprise a pin 24 mounted for axial and rotational movement in a corresponding opening in the side wall portion 18a. Secured to one end of the pin 24 is an operating lever 26 having at its lower end a tapered portion 26a adapted to extend within a corresponding tapered space defined by a retainer or locking member 28 carried by the external surface of rear wall 18. When in the extended position illustrated in FIGURE 2, the pin 24 is adapted to extend into a corresponding bore 30 contained in the lower corner portion of the container 8.

Extending between the lower rear portions of the side walls 14 and 16 is a pivot shaft 32 the ends of which are journalled in journal blocks 34 secured beneath the portions of platform 4 adjacent the opening 12. The housing 10 is adapted to pivot downwardly from the illustrated supporting position to the retracted position illustrated in phantom in FIGURE 2. When the housing 10 is in this retracted position, the supporting surface adjacent the upper extremity of the third wall portion 18a abuts a stationary stop 38 that is secured beneath the platform surface and partially extends beneath opening 12 as shown in FIGURE 4. As shown in phantom in FIGURE 2, when the housing 10 is in the retracted position supported by stop 38, the rear wall 18 is horizontal and coplanar with the platform 4, and since the configuration and size of the opening 12 correspond with the rear wall 18, the opening is substantially closed by the housing 10 and the upper surface of the platform is substantially continuous.

Secured to the lowermost edge portions of the external surfaces of the side walls 14 and 16 are a pair of parallel abutments or supporting blocks 40 and 42. These supporting blocks are adapted to engage corresponding lowermost stop surfaces on the platform 4 adjacent opening 12 (as shown in FIGURE 3) to prevent housing 10 from pivoting in the counterclockwise direction from the supporting position illustrated in solid lines in FIGURE 2. A further abutment 43 is provided on the third wall 18 for cooperation with the adjacent upper surface of the platform 4. Consequently, the cooperation between stop 38 and the third wall portion 18a limits the extent of pivotal movement of housing 10 in the clockwise direction in FIGURE 2, and the cooperation between abutments 40, 42 and 43 and the corresponding platform surfaces limit the extent of pivotal movement in the counterclockwise direction. The abutment 43 relieves the weight of the vertical load.

In accordance with an important feature of the invention, means are provided for releasably locking the housing 10 in the extended load supporting position. These locking means comprise a pair of colinearly arranged lock bars 44 and 46 that are supported for axial sliding movement in a guide 48 secured between the lowermost forward edge portions of side walls 14 and 16. At their remote free ends, the lock bars are tapered and extend outwardly through corresponding openings contained in the side walls to abut the adjacent upper surfaces of platform 4 (as shown in FIGURE 3) to lock the housing in the extended upright position illustrated in solid lines in FIGURE 2. The lock bars are biased by spring 50 to the locking position, the axial extent of travel of said bars being limited by the cooperation between laterally extending pins 52 and slots 54. The guide 48 is supported by the T-shaped support 58 the ends of which are secured to the corresponding inner surfaces of the housing side walls.

Figure 1:
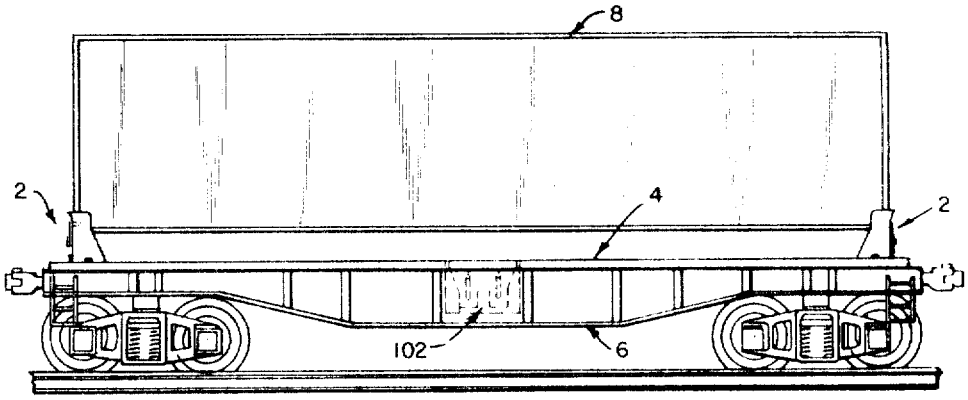
FIGURE 1 illustrates a railroad flat car including a plurality of the container corner supports of the present invention.
Figure 2:
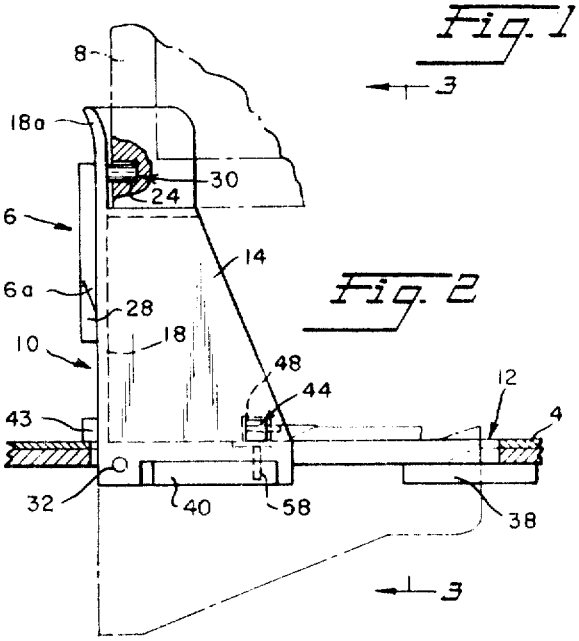
FIGURE 2 is a detailed elevational view of one of the container supports of FIGURE 1.

In accordance with another feature of the invention the cargo carrying vehicle 6 of FIGURE 1 is adapted to transport a plurality of longitudinally arranged smaller containers 60 as shown in FIGURE 6. To this end, a plurality of additional supports 102 are mounted in corresponding platform openings 112 for pivotal movement between retracted (FIGURE 1) and extended (FIGURE 6) positions. As distinguished from the outermost corner supporting housings 2, each of the intermediate support housings 102 is pivotable about a pivot shaft 132 that extends longitudinally of the vehicle 6, rather than transversely. At its upper end, the housing 102 includes vertical portions 118a between the outermost ends of which are orthogonally arranged transverse vertical portions 116a. These vertical portions cooperate to longitudinally and laterally stabilize the adjacent corners of the containers 60 that are supported upon the horizontal load supporting surface 120. Lock pins 124 are provided for axial sliding movement in openings contained in the vertical portions 118a to cooperate with corresponding openings in the containers to stabilize the containers on the corner supports.

In the embodiment of FIGURES 6–9, means including a common actuator 170 are provided for simultaneously retracting the locking bars 144 and 146 from their illustrated extended positions to their retracted positions against the biasing force of spring means 150. These actuator means include an operating member 172 that is rotatably connected with the housing 110 and includes rod means 174 pivotally connected at opposite ends with said lock bars 144 and 146 and with diametrically opposed points 176 and 178, respectively, on the operator 172.

As in the embodiment of FIGURES 2–5, the corner support 102 of FIGURES 7–9 includes abutment means 140, 142 and 143 arranged for cooperation with corresponding platform surfaces to prevent pivotal movement of the housing in the clockwise direction from the extended position shown in FIGURE 7. The housing 102 further includes surfaces on the extremities of the portions 118a for cooperation with the platform-carried stop 138 to support the housing when in the retracted position. As described above, the housing 102, when in the retracted position, is substantially coplanar with the platform surface and substantially completely fills the opening 10.

While in accordance with the provisions of the patent statutes the preferred forms and embodiments of the invention have been illustrated and described, it will be apparent to those skilled in the art that various changes may be made in the disclosed apparatus without deviating from the invention set forth in the following claims.

What is claimed is:

1. A corner support for supporting at least one corner of a container at a level above the horizontal platform of a cargo carrying vehicle, comprising a housing including parallel spaced first and second side walls, a third transverse wall normal to and connected between corresponding edge portions of said first and second side walls, and a fourth load-supporting wall connected between said first and second side walls, said fourth wall being normal to said first, second and third walls;

means mounting said housing for pivotal movement within an opening contained within said platform, said opening having a configuration corresponding generally with that of said third wall, said mounting means including a horizontal pivot axis normal to said first and second walls and so arranged relative to said platform to permit pivotal movement of said housing between a first position in which said third wall is horizontal and coplanar with the upper surface of said platform and said first, second and fourth walls extend downwardly from said third wall, to a second position in which said first, second and third walls are vertical and extend upwardly from the upper surface of said platform and said fourth wall is horizontal and is elevated above said platform upper surface; and means carried by at least one of said walls for releasably locking said housing in said second position.

2. Apparatus as defined in claim 1, wherein said locking means comprises at least one lock bar mounted for axial movement in a direction normal to one of said first and second walls, and spring means biasing said lock bar from a retracted position in which said lock bar is contained wholly between said first and second walls toward an extended position in which, when said housing is in said second position, said lock bar is in parallel contiguous engagement with the horizontal upper surface of said platform.

3. Apparatus as defined in claim 2, and further including stop means carried by said housing for cooperation with corresponding surfaces on the platform for preventing pivotal movement of said housing beyond said first and second positions.

4. Apparatus as defined in claim 3, wherein said stop means comprise first abutment means carried by the external surface of at least one of said first and second walls for abutting engagement, when said housing is in said second position, with the lower surface of an adjacent portion of said platform.

5. Apparatus as defined in claim 4, wherein said stop means further includes second abutment means carried by said third wall for engagement with the upper surface of the platform to prevent pivotal movement of said housing beyond said second position, said second abutment means being arranged relative to said pivot axis to remove the load therefrom when said housing is in the second position.

6. Apparatus as defined in claim 5, wherein said stop means further includes a supporting portion on said third wall means extending upwardly beyond said fourth load-supporting wall, at least a part of said third wall portion being adapted, when said housing is in said first position, to abut the corresponding upper surface of a horizontal stop carried by said platform and extending partially beneath said opening, whereby said housing is rigidly supported in said first position.

7. Apparatus as defined in claim 6 and further including releasable connector means carried by the supporting portion of said third wall and operable, when said housing is in said second position and a container is at least partially supported on said fourth load supporting wall, to secure said container against vertical movement relative to said fourth wall.

8. Apparatus as defined in claim 7 wherein said releasable connector means comprises a rod mounted in an opening contained in the supporting portion of said third wall for axial sliding movement between an extended position parallel with and spaced above said fourth wall, and a retracted position in which said rod is retracted from the space above said fourth wall, and means for locking said rod in said extended position, whereby when said rod, in said extended position, extends within a corresponding opening in a container, said container is restrained against vertical movement relative to said housing.

9. Apparatus as defined in claim 2, wherein said housing, in said second position, includes at least one vertical wall portion extending normal to said third wall supporting portion, said third wall supporting portion being adapted to laterally stabilize a corner portion of a container supported on said fourth wall.

10. Apparatus as defined in claim 9 wherein said vertical wall portion is intermediate the ends of said third wall supporting portion, whereby the corners of two containers may be supported on said fourth wall.

11. Apparatus as defined in claim 2, wherein a pair of said spring-biased lock bars are provided in association with said first and second side walls, respectively, and further including means for simultaneously displacing said lock bars from their extended to their retracted positions.

*12. A corner support for supporting at least one corner of a container at a level above the horizontal platform of a cargo carrying vehicle, comprising a housing having in its normal load-supporting position at least two vertical walls, one arranged transversely to the other, and a horizontal load-supporting wall connected with the upper portions of said vertical walls; means mounting said housing for pivotal movement within an opening contained within said platform, said opening having a configuration corresponding generally with that of said vertical transverse wall, said mounting means including a horizontal pivot axis parallel with said vertical transverse wall and so arranged relative to said opening to permit pivotal movement of said housing from said normal load-supporting position to a retracted position in which said vertical transverse wall is horizontal and coplanar with said platform, and said other vertical wall and said load-supporting wall extend downwardly from said vertical transverse wall; and means carried by at least one of said walls for releasably locking said housing in said normal load-supporting position.*

*13. A corner support as defined in claim 12 including, in addition, stop means carried by said support for cooperation with corresponding surfaces on the platform for preventing pivotal movement of said housing beyond said normal load-supporting position and said retracted position.*

*14. A corner support as defined in claim 13 wherein said stop means comprise abutment means carried by said support for abutting engagement, when said housing is in said retracted position, with the surface of an adjacent portion of said platform.*

*15. A corner support as defined in claim 13 wherein said stop means includes abutment means carried by said support for engagement with the upper surface of the platform to prevent pivotal movement of said housing beyond said load-supporting position, said abutment means being arranged relative to said pivot axis to remove the load therefrom when said housing is in the load-supporting position.*

*16. A corner support for supporting at least one corner of a container at a level above the horizontal platform of a cargo carrying vehicle, comprising a housing having in its normal load-supporting position at least two vertical walls, one arranged transversely to the other, and a horizontal load-supporting wall connected with the upper portions of said vertical walls; means mounting said housing for pivotal movement within an opening contained within said platform, said opening having a configuration corresponding generally with that of said vertical transverse wall, said mounting means including a horizontal pivot axis parallel with said vertical transverse wall and so arranged relative to said opening to permit pivotal movement of said housing from said normal load-supporting position to a retracted position in which said vertical transverse wall is horizontal and coplanar with said platform, and said other vertical wall and said load-supporting wall extend downwardly from said vertical transverse wall; and means carried by at least one of said walls for releasably locking said housing in said normal load-supporting position; and stop means carried by said corner support for cooperation with corresponding surfaces on the platform for preventing pivotal movement of said housing beyond said normal load-supporting position and said retracted position.*

*17. A corner support as defined in claim 16 including orthogonally arranged vertical portions extending upwardly from said horizontal load-supporting wall.*

References Cited

The following references, cited by the Examiner, are of record in the patented file of this patent or the original patent.

UNITED STATES PATENTS

| | | | |
|---|---|---|---|
| 1,102,773 | 7/1914 | Martin | 105—368 |
| 1,845,593 | 2/1932 | Fildes | 105—366 |

| | | | |
|---|---|---|---|
| 2,017,414 | 10/1935 | Liebegott | 105—366 |
| 2,631,885 | 3/1953 | Ault | 105—366 X |
| 3,160,117 | 12/1964 | Willison et al. | 248—119 X |
| 3,296,981 | 1/1967 | Bergstrand | 105—366 |
| 3,307,496 | 3/1967 | Sweger | 105—366 |

ROY D. FRAZIER, Primary Examiner

F. DOMOTOR, Assistant Examiner

U.S. Cl. X.R.

105—366